United States Patent
Meins

(10) Patent No.: US 6,454,495 B1
(45) Date of Patent: Sep. 24, 2002

(54) PNEUMATIC TRANSPORTING METHOD AND APPARATUS

(75) Inventor: Thomas Meins, Hamburg (DE)

(73) Assignee: Hauni Maschinenbau Aktiengesellschaft, Hamburg (DE)

( * ) Notice: Subject to any disclaimer, the term of this patent is extended or adjusted under 35 U.S.C. 154(b) by 0 days.

(21) Appl. No.: 09/636,467

(22) Filed: Aug. 11, 2000

(30) Foreign Application Priority Data

Aug. 12, 1999 (DE) .......................................... 199 37 636

(51) Int. Cl.$^7$ ............................................... B65G 51/16
(52) U.S. Cl. ............................ 406/19; 406/93; 406/195; 406/197
(58) Field of Search ............................... 406/19, 85, 93, 406/192, 195, 197

(56) References Cited

U.S. PATENT DOCUMENTS

| 3,974,007 | A |   | 8/1976  | Greve           |         |
|-----------|---|---|---------|-----------------|---------|
| 4,178,662 | A |   | 12/1979 | Borodin         |         |
| 4,358,226 | A |   | 11/1982 | Nagata et al.   |         |
| 5,135,008 | A |   | 8/1992  | Oesterling et al. |       |
| 5,556,236 | A |   | 9/1996  | Seim, II, et al. |        |
| 5,647,697 | A | * | 7/1997  | Gigante et al.  | 406/83  |
| 5,651,643 | A | * | 7/1997  | Haul et al.     | 406/3   |
| 5,695,070 | A | * | 12/1997 | Draghetti       | 209/536 |
| 6,024,208 | A | * | 2/2000  | Chooi et al.    | 198/534 |

FOREIGN PATENT DOCUMENTS

| DE | 0 901 758 | 7/1972 |
| DE | 2165782   | 7/1972 |
| DE | 2 306 096 | 8/1974 |
| EP | 0 330 531 | 8/1989 |

* cited by examiner

Primary Examiner—Christopher P. Ellis
Assistant Examiner—Joe Dillon, Jr.
(74) Attorney, Agent, or Firm—Venable; Robert Kinberg; Chad C. Anderson

(57) ABSTRACT

Rod-shaped articles of the tobacco processing industry are advanced lengthwise in a conduit by a first air flow. Blasts of compressed air are admitted into the conduit behind successive articles to promote their advancement in a larger-diameter arcuate section of the conduit, particularly from a lower level to a higher level. The admission of successive blasts of compressed air is carried out by an open-and-shut valve which receives signals from an article detector located downstream of the valve.

20 Claims, 1 Drawing Sheet

PNEUMATIC TRANSPORTING METHOD AND APPARATUS

CROSS-REFERENCE TO RELATED CASES

This application claims the priority of commonly owned German patent application Ser. No. 199 37 636.0 filed Aug. 12, 1999. The disclosure of the above-referenced German patent application, as well as that of each U.S. and/or foreign patent and patent application mentioned in the specification of the present application, is incorporated herein by reference.

BACKGROUND OF THE INVENTION

The invention relates to improvements in methods of and apparatus or systems for pneumatically transporting successive commodities of a series of commodities in a conduit wherein the commodities are propelled by a flow or stream of a gaseous fluid, e.g., compressed air.

Systems of the above outlined character are utilized for the transport of numerous commodities, for example, to advance plain or filter cigarettes, filter rod sections and/or other rod-shaped articles or products of the tobacco processing industry into or from storage facilities and/or between different levels, as well as to change the orientation (such as the direction of advancement) of successive products (e.g., through angles close to or matching 90°).

In order to ensure predictable and efficient advancement of certain commodities by resorting to a pneumatic transporting system, especially the transport of products into and from mass-producing machines or production lines, it is necessary to design the path for the advancement of successive commodities (normally within a pneumatic conduit) in such a way that the commodities are compelled to advance in the conduit with minimal or negligible play, i.e., that a small or very small quantity of the selected gaseous fluid can flow around and forwardly beyond the conveyed commodities. In other words, the efficiency of a conventional transporting system for discrete commodities depends, to a large extent, upon the configuration and upon the dimensions of the path which is established for pneumatic propulsion of discrete commodities from a first station (sender) to a second station (receiver).

Numerous problems arise when a pneumatic transporting system is selected for the advancement of elongated rod-shaped commodities such as plain or filter cigarettes, rod-shaped sections of filters for tobacco smoke and/or other rod-shaped products of the tobacco processing industry. For example, if a cigarette or another non-elastic rod-shaped commodity is to be transported within a conduit along a path which is configurated to change the orientation of the cigarette (e.g., through a right angle or thereabout), it is necessary to increase the inner diameter of a certain length of the conduit in order to ensure that the cigarette can change the direction of its advancement (e.g., from horizontally to vertically or vice versa) without undergoing any (or any appreciable) permanent deformation.

The just discussed problems can be overcome, at least to a certain extent, if there is ample room to accommodate a conduit having one or more arcuate sections with large radii of curvature. However, such room is not always available (or is not available at all) in numerous plants (such as in cigarette making factories) which are designed for mass production of rod-shaped articles and wherein hundreds of discrete machines or production lines are normally installed in a single room in close or immediate proximity to each other.

In accordance with heretofore known proposals, the above outlined problems are sought to be overcome by employing pneumatic conduits which include arcuate sections having large or huge inner diameters so that a cigarette or an analogous essentially non-elastic commodity can change the direction of its advancement without undergoing any (or any appreciable) permanent deformation. Reference may be had, for example, to published German patent application Ser. No. 21 65 782. However, and as already pointed out hereinbefore, the efficiency of such pneumatic transporting systems is low (and often too low) because a high percentage of gaseous fluid (such as compressed air) is free to bypass a cigarette advancing in a large-diameter arcuate section of the conduit. The situation is aggravated if the cigarettes are to be advanced from a lower level to a higher level, i.e., when the gaseous conveying fluid is compelled to overcome the action of gravity force upon the advancing commodities. For example, the just outlined situation can develop when filter rod sections (e.g., filter mouthpieces of double or six times unit length) are to be transported from a filter rod making machine (e.g., a machine of the type disclosed in U.S. Pat. No. 3,974,007 granted Aug. 10, 1976 to Greve for "METHOD AND APPARATUS FOR THE PRODUCTION OF FILTER ROD SECTIONS OR THE LIKE") to a tipping machine (e.g., a machine of the type described and illustrated in commonly owned U.S. Pat. No. 5,135,008 granted Aug. 4, 1992 to Oesterling et al. for "METHOD OF AND APPARATUS FOR MAKING FILTER CIGARETTES").

OBJECTS OF THE INVENTION

An object of the present invention is to provide a pneumatic transporting system which overcomes the aforediscussed drawbacks of conventional systems in a simple, efficient and space-saving manner.

Another object of the invention is to provide a pneumatic transporting system which can be utilized with particular advantage in tobacco processing plants for controlled and predictable conveying of huge quantities of rod-shaped articles (such as plain or filter cigarettes, cigars or cigarillos and/or filter rod sections) between different levels and/or through great distances at a high frequency such as is required in a modern tobacco processing plant.

A further object of the invention is to provide a novel and improved method of transporting huge quantities of cigarettes, filter rod sections and/or other non-elastic rod-shaped commodities through short and/or great distances as well as between different levels (if and when necessary) without affecting the integrity, the appearance and/or other desirable characteristics of the conveyed commodities.

An additional object of the invention is to provide a cigarette making machine or production line which embodies one or more transporting systems exhibiting the above outlined characteristics.

Still another object of the invention is to provide the improved apparatus with a novel and improved combination of a conduit and one or more gas flow admitting and regulating units.

A further object of the instant invention is to provide an economical pneumatic transporting apparatus which can be put to use as a superior substitute for heretofore known apparatus for the transport of rod-shaped commodities of the tobacco processing industry.

SUMMARY OF THE INVENTION

One feature of the present invention resides in the provision of a transporting system for a series of commodities, e.g., rod-shaped commodities such as filter mouthpieces of multiple unit length. The improved apparatus comprises a pneumatic conduit which defines a predetermined path for successive commodities of the series and for a first stream or flow of a gaseous fluid (such as compressed air) serving to propel the commodities along the path in a predetermined direction, and means for admitting into the path an additional flow of gaseous fluid which assists the first flow in propelling commodities in the predetermined direction.

The conduit is or can be provided with discrete first and second inlets which respectively serve to admit the first flow and the additional flow into the predetermined path. At least one of the flows can contain compressed air, i.e., a compressed gaseous fluid.

The conduit can include an arcuate section which is located downstream of the second inlet (as considered in the predetermined direction). That portion of the path which is defined by the arcuate section of the conduit can have a cross-sectional area larger than that of the conduit section(s) located upstream and/or downstream of the arcuate section. For example, the arcuate section of the path can be designed (curved) in such a way that it can change the direction of transport of successive commodities through an angle which matches or approximates a right angle.

The second inlet can be defined by an adjustable valve, e.g., by a signal-responsive open-and-shut valve which is set up to intermittently admit the gaseous fluid of the additional flow into the elongated path by way of the second inlet. Such system can further include regulating means for opening the valve in response to propulsion (by the first flow) of a commodity past the second inlet. The regulating means can include at least one sensor which serves to monitor the path for the presence of commodities in the region of the second inlet. The sensor is arranged to generate signals which serve to effect an opening of the valve in response to advancement of commodities beyond the second inlet.

If the commodities are rod-shaped articles, the path can include a portion having a circular cross-sectional outline, located at the second inlet and having a diameter which at least approximates the diameter of a rod-shaped article.

Another feature of the present invention resides in the provision of a method of transporting a series of commodities, e.g., rod-shaped articles of the tobacco processing industry. The improved method comprises the steps of establishing an elongated path for the advancement of successive commodities of the series, pneumatically propelling successive commodities in a predetermined direction along the path by resorting to a first flow (stream) of a gaseous fluid, and introducing into the path a second flow of a gaseous fluid to thus enhance the propelling action of the first flow.

The gaseous fluid of at least one of the flows can be constituted by compressed air.

The propelling step includes or can include advancing successive commodities of the series at spaced-apart intervals, and such method can further comprise the steps of monitoring a predetermined portion of the path and generating signals upon detection of commodities in the predetermined portion of the path. The introducing step of such method can include admitting into the path gaseous fluid in response to the signals and behind the respective commodities (as seen in the predetermined direction).

If the commodities are elongated rod-shaped articles (such as plain or filter cigarettes or filter rod sections), the propelling step includes advancing the articles lengthwise.

If the path exhibits an arcuate section upstream of a first at least substantially straight section and downstream of a second at least substantially straight section (as seen in the predetermined direction), the introducing step can include admitting into the second at least substantially straight section of the path a stream of compressed gaseous fluid behind each of successive commodities of the series to thus promote the advancement of commodities into and along the arcuate section of the path.

If the commodities are elongated rod-shaped articles, the establishing step can include imparting to the path a configuration such that a rod-shaped commodity advancing along the path changes its direction of movement through a predetermined angle, e.g., an angle which is at least close to 90°.

Furthermore, the establishing step can include providing a path wherein the commodities advance from a first level to a second level, e.g., from a lower level to a higher level. Such advancement can take place while the commodities change the direction of their advancement (e.g., through 90° from a movement in a horizontal plane to a movement in a vertical plane).

Still further, the establishing step can include providing a path (e.g., a substantially L-shaped path) having at least one section wherein the commodities are propelled with a negligible play.

The novel features which are considered as characteristic of the invention are set forth in particular in the appended claims. The improved apparatus itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

The single Figure of the drawing is a partly schematic fragmentary elevational view of a transporting system which is designed for the transport of rod-shaped commodities and embodies one presently preferred form of the invention.

DESCRIPTION OF PREFERRED EMBODIMENTS

Figure 1:
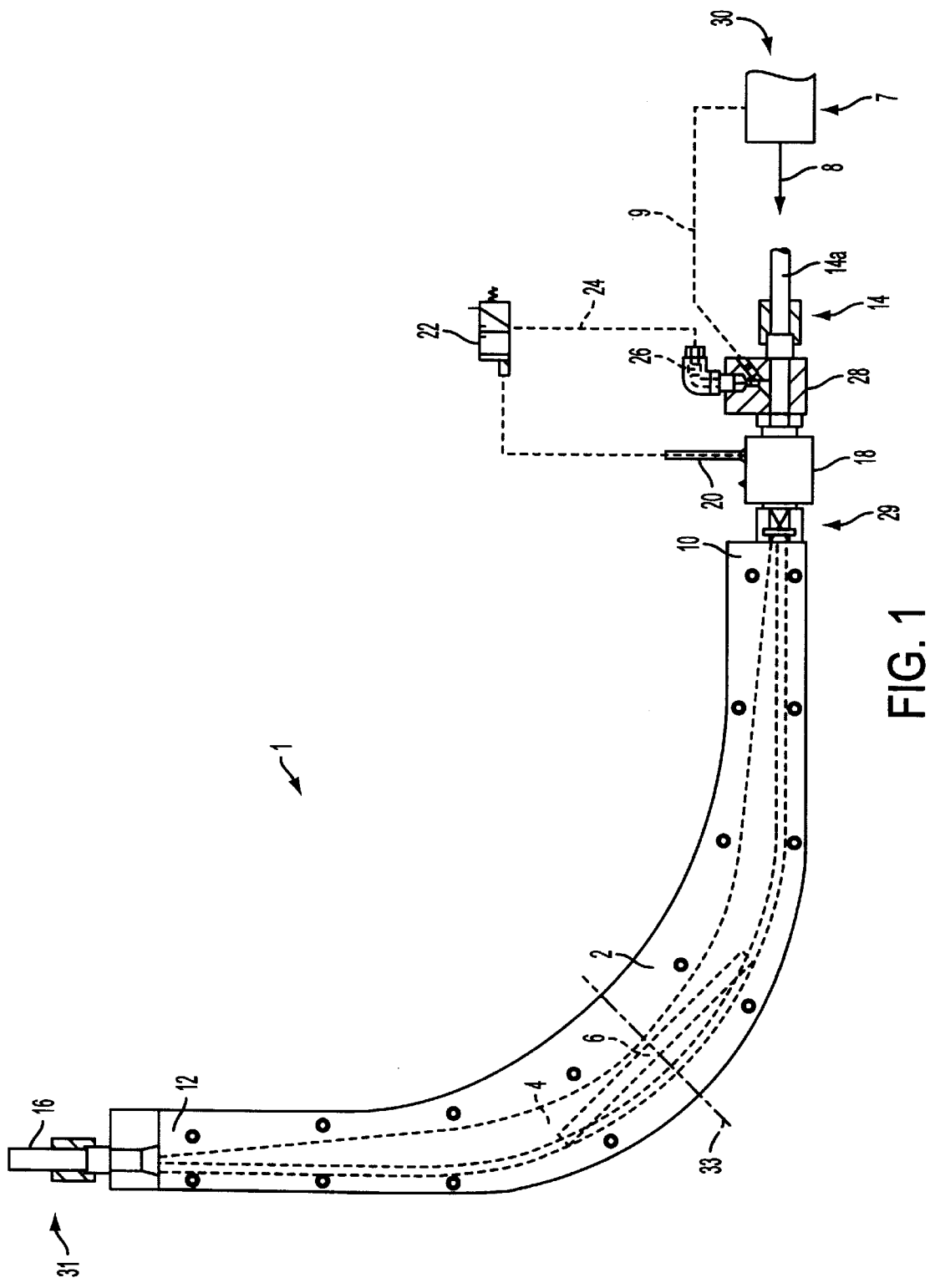

The drawing shows a portion of a transporting system 1 which can be utilized in a production line serving to turn out filter cigarettes and including a filter rod maker (refer to the aforementioned U.S. '007 patent to Greve) and a filter tipping machine (refer to the aforementioned U.S. '008 patent to Oesterling et al.). The system 1 can be utilized to transport successive rod-shaped commodities 6 (such as filter mouthpieces or rod sections of six times unit length) from the discharge end of the filter rod maker to the magazine of the tipping machine.

The system 1 comprises a composite pneumatic conduit including a straight horizontal first section 14, an arcuate intermediate section 2, and a straight vertical third section 16. These sections define an elongated arcuate path and are installed in the production line in such a way that successive commodities 6 (hereinafter called rod-shaped articles or articles for short) are caused to advance from the lower level 30 of the section 14 to the higher level 31 of the section 16 and to change the direction of their advancement through an angle of at least substantially 90° during transport through that portion (4) of the elongated path which is defined by the arcuate median conduit section 2.

The cross-sectional area of the path portion defined by the conduit section 14 is round and its diameter only slightly exceeds the diameters of the articles 6, and the same preferably applies, or can hold true, for the cross-sectional area of the path portion defined by the conduit section 16. On the other band, the cross-sectional area of the path portion 4 defined by the arcuate median section 2 of the pneumatic conduit first gradually increases from that matching the cross-sectional area of the path portion defined by the section 14 to a considerably larger cross-sectional area midway between the sections 14, 16, and thereupon gradually decreases to the cross-sectional area of the path portion defined by the section 16. This ensures that an article 6 advancing in the path portion 4 defined by the arcuate section 2 can change its orientation without undergoing any, or any appreciable, deformation.

The section 14 is separably or permanently but sealingly affixed to the adjacent end portion 10 of the arcuate median conduit section 2, and the other end portion 12 of the section 2 is permanently or separably but sealingly affixed to the section 16.

A source 7 of compressed gaseous fluid (e.g., a compressor or accumulator of any known design) discharges a first flow or stream of such fluid into the inlet 14a of the conduit section 14. Such first flow propels successive articles 6 of a series of such articles into and within the conduit sections 14, 2, 16 and on to the magazine of the tipping machine. The manner in which successive spaced-apart articles 6 are fed into the conduit section 14 (to advance in the direction indicated by the arrow 8) is not shown in the drawing.

The flow of compressed air issuing from the source 7 and advancing in the path for the articles 6 toward and into the secton 16 can effectively propel successive articles into the path portion 4. However, and since the cross-sectional area of the median region of the path portion 4 exceeds the cross-sectional area of the path portion in the section 14, the propelling action of the flow of compressed gaseous fluid in the path portion 4 is much less pronounced. In addition, the flow of compressed gaseous fluid flowing from the section 14 into and within the section 2 must overcome the force of gravity acting upon the articles 6 advancing from the lower level of the conduit section 14 to the higher level of the conduit section 16.

In order to assist the aforediscussed first flow of compressed gaseous fluid in predictable and rapidly propelling successive articles 6 from the section 14, through the section 2 and into the section 16, the transporting unit 1 comprises means 28 for intermittently admitting into the path for the articles 6 an additional or second flow of a compressed gaseous fluid whenever an article has advanced beyond a second inlet 29 controlled by the fluid admitting means 28.

The admitting means 28 comprises of constitutes a normally closed open-and-shut valve having a gas-admitting port connected to the source 7 by a pipe 9 indicated by a phantom line. The valve 28 is responsive to signals generated by a sensor 18 which is installed in the discharge end of the conduit section 14 or in the adjacent receiving end 10 of the conduit section 2 and transmits a signal (e.g., an electric signal) via conductor means 20 whenever it detects the presence of an article 6 advancing toward the enlarged median part of the path portion 4, i.e., the presence of an article downstream of the inlet defined by the valve 28.

The conductor 20 transmits signals to a control circuit or regulating circuit 22 which controls a valve opening and closing device 26. The latter opens the valve 28 when it receives a signal via conductor means 24.

When an article 6 (which advances in the conduit section 14 in the direction indicated by the arrow 8) reaches the sensor 18, the latter transmits a signal via conductor means 20 and the regulating circuit 22 actuates the device 26 via conductor means 24. This causes the valve 28 to open and to permit compressed gaseous fluid (such as atmospheric air) to flow from the source 7, via pipe 9 and into the path portion defined by the conduit section 14 or 2. Thus, the article 6 which has initiated the generation of a signal at 18 is acted upon by a blast of compressed gaseous fluid in addition to the action of compressed gaseous fluid being admitted by the source 7 into the inlet 14a of the conduit section 14. That portion of the path which receives the just discussed article 6 when the sensor 18 transmits a signal to the circuit 22 is dimensioned to snugly receive the article. This ensures that the article receives a pronounced impetus for advancement along the path portion 4 and into the conduit section 16. In other words, additional gaseous fluid being admitted by the valve 28 compensates for leakage of fluid entering the path portion 4 via conduit section 14; such leakage is attributable to the fact that the cross-sectional area of the central part of the path portion 4, for example the cross-sectional area designated by reference number 33, considerably exceeds the cross-sectional area of an article 6.

The pressure and quantity of additional flow of gaseous fluid entering the conduit including the sections 14, 2 16 via inlet controlled by the valve 28 can be readily selected in such a way that the additional flow compensates for the reduced propelling action of the first flow (from the source 7 directly into the inlet of the section 14) attributable to the ability of fluid of the first flow to bypass an article 6 in the arcuate path portion 4, as well as for the fact that an article advancing in the section 2 must be lifted from the level of the section 14 to the level of the section 16 against the action of gravity.

It is clear that the transporting system 1 can comprise or cooperate with two discrete sources of gaseous fluid; for example, the source 7 can be utilized to supply gaseous fluid to the inlet 14a of the conduit section 14 or to the inlet controlled by the open-and-shut valve 28, and a second source can be provided to supply gaseous fluid to the valve 28 or to the inlet 14a. The gaseous fluid being supplied to the valve 28 and/or to the inlet 14a is but need not always be atmospheric air.

An advantage of the feature that the valve 28 is installed upstream of the arcuate section 2 of the composite pneumatic conduit including the sections 14, 2, 16 is that the additional flow which enters the composite conduit in response to opening of the valve 28 can reliably compensate for losses of fluid forming part of the first flow and for the need to raise successive articles 6 from the level of the section 14 to that of the section 16. As already mentioned above, the trailing end of that article 6 which has initiated an opening of the valve 28 (via sensor 18, regulating unit 22 and actuating device 26) is snugly received in the respective portion of the path when it is subjected to the action of additional flow of gaseous fluid entering the path via pipe 9 and valve 28.

The sensor 18 and the regulating circuit 22 can be omitted if successive articles 6 enter the conduit section 14 at predetermined (fixed) intervals. The normally closed valve 28 is then set to open at a predetermined frequency in order to admit a second or additional flow of gaseous fluid whenever the trailing end of an article 6 enters a path portion at a predetermined distance from and downstream of the inlet controlled by the valve 28. In other words, the frequency at which the valve 28 opens can be properly related to (synchronized with) the frequency at which the conduit section 14 receives articles 6 from a filter rod making machine or from another source of rod-shaped commodities.

The provision of the valve 28 is preferred if the conduit section 14 does not receive articles 6 at a fixed frequency and/or when it is desired or necessary to admit additional gaseous fluid when an article 6 is located at a predetermined distance from and downstream of the valve 28 (irrespective of the frequency at which successive articles of a series of such articles enter the inlet 14a of the conduit section 14). Such mode of operation contributes to an even more predictable transport of successive articles 6 from the level of the conduit section 14 into the conduit section 16.

The arcuate conduit section 2 can be omitted if the section 16 is coaxial with the section 14; the admission of additional gaseous fluid (via valve 28 or an equivalent inlet-controlling device) then serves the purpose of ensuring that the articles entering the section 16 advance therein at a preselected speed or within a preselected speed range. The primary purpose of the section 2 (i.e., of the path portion 4) is to ensure that the articles 6 are not damaged while they are caused to change the direction and/or level of their advancement from a source to a processing station.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of pneumatic transporting apparatus for cigarettes or the like and, therefore, such adaptations should and are intended to be comprehended within the meaning and range of equivalence of the appended claims.

What is claimed is:

1. A transporting system for a series of commodities, comprising:
    a pneumatic conduit defining an elongated path for successive commodities of the series and for a first flow of a gaseous fluid serving to propel the commodities along said path in a predetermined direction; and
    means for admitting into said path an additional flow of gaseous fluid which assists said first flow in propelling commodities in said direction.

2. The transporting system of claim 1, wherein said conduit has discrete first and second inlets for said first and additional flows, respectively.

3. The transporting system of claim 2 for the transport of rod-shaped commodities each having a predetermined diameter, wherein said path includes a portion having a circular cross-sectional outline, located at said second inlet and having a diameter at least approximating said predetermined diameter.

4. The transporting system of claim 2, wherein said conduit includes an arcuate section located downstream of said second inlet, as considered in said direction.

5. The transporting system of claim 4, wherein that portion of said path which is defined by said arcuate section of said conduit has a first cross-sectional area and said conduit further includes second and third sections respectively located upstream and downstream of said arcuate section, that portion of said path which is defined by at least one of said second and third sections having a cross-sectional area smaller than said first cross-sectional area.

6. The transporting system of claim 4, wherein said arcuate section is arranged to change the direction of transport of successive commodities through an angle which at least approximates a right angle.

7. The transporting system of claim 2, wherein said second inlet is defined by an adjustable valve.

8. The transporting system of claim 7, wherein said valve is an open-and-shut valve arranged to intermittently admit the additional flow into said path by way of said second inlet.

9. The transporting system of claim 7, wherein said valve is an open-and-shut valve and further comprising regulating means for opening said valve in response to propulsion of a commodity past said second inlet.

10. The transporting system of claim 9, wherein said regulating means comprises at least one sensor arranged to monitor said path for the presence of commodities in the region of said second inlet.

11. The transporting system of claim 10, wherein said sensor is arranged to generate signals serving to effect an opening of said valve in response to advancement of commodities beyond said second inlet.

12. A method of transporting a series of commodities, comprising the steps of:
    establishing an elongated path for the advancement of successive commodities of the series;
    pneumatically propelling successive commodities in a predetermined direction along the path with a first flow of a gaseous fluid; and
    introducing into the path a second flow of a gaseous fluid to thus enhance the propelling action of the first flow.

13. The method of claim 12, wherein the gaseous fluid of at least one of the first and second flows is compressed air.

14. The method of claim 12, wherein said propelling step includes advancing successive commodities at spaced-apart intervals, and further comprising the steps of monitoring a predetermined portion of the path and generating signals upon detection of commodities in said predetermined portion of the path, said introducing step including admitting into the path gaseous fluid in response to said signals and behind the respective commodities as seen in said direction.

15. The method of claim 12, wherein the commodities are elongated rod-shaped articles and said propelling step includes advancing the articles lengthwise.

16. The method of claim 12, wherein the path exhibits an arcuate section upstream of a first substantially straight section and downstream of a second substantially straight section as seen in said direction, said introducing step including admitting into the second straight section of said path a stream of compressed gaseous fluid behind each of successive commodities of the series to thus promote the advancement of commodities into and along said arcuate section.

17. The method of claim 12, wherein the commodities are elongated rod-shaped commodities, and wherein said establishing step includes imparting to the path a configuration such that a commodity advancing therealong changes its direction of movement through an angle of at lest substantially 90°.

18. The method of claim 12, wherein said establishing step includes providing a path wherein the commodities advance from a first level to a different second level.

19. The method of claim 12, wherein said establishing step includes providing a path having at least one section wherein the commodities are propelled with a negligible play.

20. A transporting system for a series of commodities, comprising:
    a pneumatic conduit defining an elongated path for successive commodities of the series and for a first flow of a gaseous fluid serving to propel the commodities along said path in a predetermined direction; and
    means for admitting into said path an additional flow of gaseous fluid which assists said first flow in propelling commodities in said direction,
        wherein at least one of said flows contains a compressed gaseous fluid.

\* \* \* \* \*